United States Patent [19]

Slawsky

[11] 3,783,441
[45] Jan. 1, 1974

[54] AIR LAUNCHED, WIRE GUIDED TORPEDO

[75] Inventor: Zaka I. Slawsky, Bethesda, Md.

[73] Assignee: The United States of America as represented by the Secretary of the Navy, Washington, D.C.

[22] Filed: June 30, 1965

[21] Appl. No.: 469,060

[52] U.S. Cl................... 340/2, 114/21 W, 340/3 R, 340/6 R
[51] Int. Cl.................................................. G01s 9/68
[58] Field of Search.................. 340/2, 3, 6; 114/21, 114/21 W, 23; 244/3.11, 3.12, 3.13, 3.14

[56] References Cited
UNITED STATES PATENTS 3,161,168  12/1964  Rebikoff................................ 114/21
3,183,478  5/1965  Slawsky et al.......................... 340/2

Primary Examiner—Richard A. Farley
Attorney— R. S. Sciascia and J. A. Cooke

[57] ABSTRACT

A submarine detecting and tracking system which utilizes sonouoys to track both a target submarine and a guided torpedo. The sonobuoy signals are received and processed on a surface vessel or aircraft and the torpedo is guided by remote control to intercept the target submarine.

13 Claims, 7 Drawing Figures

INVENTOR
Zaka I. Slawsky

ATTORNEYS

DISPLAY DEVICE
FOR SONOBUOYS 12

DISPLAY DEVICE
FOR SONOBUOYS 16

DISPLAY DEVICE
FOR SONOBUOY
24

INVENTOR
Zaka I. Slawsky

BY

ATTORNEYS

AIR LAUNCHED, WIRE GUIDED TORPEDO

The invention described herein may be manufactured and used by or for The Government of the United States of America for governmental purposes without the payment of any royalties thereon or therefor.

The present invention relates to a system and method of submarine detection and tracking and more particularly to a correlation sonobuoy system which may be dropped from an aircraft or from a surface vessel or used on board a submarine for determining a target submarine's location and depth without requiring precise knowledge of the location of the sonobuoys.

In the field of anti-submarine warfare, it has been the general practice to employ correlation sonobuoy systems to provide the data necessary to calculate the range and bearing of a submerged submarine relative to the locations of these sonobuoys. Although such devices have served the purpose, they have not proved entirely satisfactory under all conditions of service for the reason that considerable difficulty has been experienced in accurately locating the sonobuoys with respect to the tracking craft due to drifting of the sonobuoys. This problem becomes increasingly more acute when the sonobuoys are dropped from an aircraft into the water rather than being planted in the water by a ship or submarine due to the uncontrolled drifting during descent. Moreover, even when very mild sea conditions prevail and ocean currents are at a minimum, it is but a matter of minutes after a sonobuoy has been dropped that the location and spacing with respect to some reference points are sufficiently uncertain as to render the detectors useless. The maneuverability and speed of present day nuclear submarines make it necessary that the tracking system be effective for a sufficient period of time in order to locate the submarine after detection. This period of time, in most instances, involves more than a few minutes, and a reliable sonobuoy tracking system must therefore be dependably accurate for a considerable period of time.

The general purpose of this invention is to provide a correlation sonobuoy system which embraces all the advantages of similarly employed submarine detection and tracking systems and which does not possess any of the aforedescribed disadvantages. To attain this result, the present invention contemplates a novel fire control system wherein the sonobuoys are used to locate and track not only the target submarine but also the torpedo while the torpedo is guided along a target bearing derived from one pair of sonobuoys. The torpedo is directed by a coincidence or null type fire control system whereby deviations of the torpedo from the target bearing are detected and the course of the torpedo may be altered. By using the sonobuoys to track both the submarine and the torpedo, errors derived from the plotting systems used in the aircraft and from sonobuoy drift are avoided because the coincidence type fire control system is independent of information as to the precise locations of the sonobuoys thereby enhancing the accuracy of the data which is supplied to the aircraft.

An object of the present invention is the provision of a new and improved method for detecting, tracking and destroying a submarine by a sonobuoy system which functions independently of precise information as to sonobuoy position.

Another object of the invention is to provide a system for detecting and tracking a target submarine by means of a fire control system which may be located on either an aircraft, a surface vessel or another submarine and which does not require knowledge of the precise locations of the tracking sonobuoys.

A further object of the invention is the provision of a submarine and torpedo tracking system in which the target seeking torpedo cannot be decoyed from the target by acoustic counter-measures.

Still another object is to provide a target detecting and tracking system wherein the target may be illuminated in the event that the target goes silent during the torpedo run.

Other objects and many of the attendant advantages of this invention will be readily appreciated as the same becomes better understood by reference to the following detailed description when considered in connection with the accompanying drawings in which like reference numerals designate like parts throughout the various figures thereof and wherein.

Figure 1:
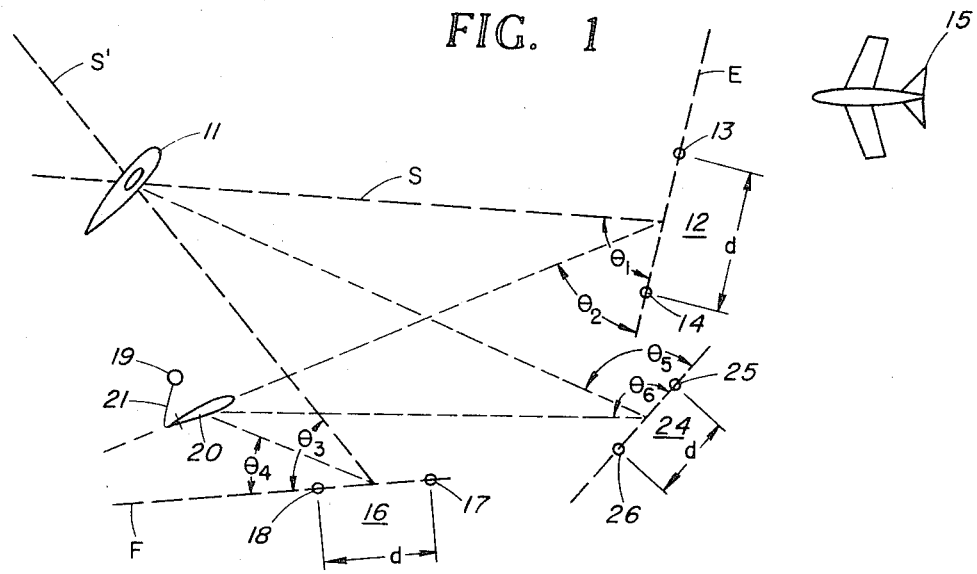
FIG. 1 illustrates a plan view of the geometry of the submarine tracking system wherein the positions of the submarine and a wire guided torpedo are detected and transmitted to a tracking vehicle such as an aircraft.

Referring now to the drawings which illustrate a preferred embodiment of the present invention, there is shown in FIG. 1 a submarine 11 which is located at some distance represented by the line S from a pair of sonobuoys 12. Each sonobuoy 13 and 14 is separated at a variable distance d which depends upon their mutual spacing and is preferably 200 to 300 feet. A line drawing between the two sonobuoys 13 and 14, which is shown as extended line E, represents the axis of the sonobuoy pair 12. Each sonobuoy has a hydrophone 27 in direct contact with the water for sensing the acoustic noise signals emanating from a target submarine 11 and an antenna for transmitting radio signals corresponding to the acoustic signals sensed at the sonobuoy. These acoustic noise signals are transmitted by a modulated radio signal from each sonobuoy to the aircraft 15. Radio receivers aboard the aircraft receive the modulated radio signals from the sonobuoys 13 and 14 in separate channels and direct the channeled signals to modulation and correlation solution circuitry shown in FIG. 5, the function of which is set forth in greater detail hereinafter.

It has been determined that the time delay which is measured as the difference in arrival times of an acoustical sound at sonobuoy 14 and sonobuoy 13 is indicative of the bearing of the sound source with respect to the axis of the sonobuoys. For example, if the acoustical sound source or submarine is on the perpendicular bisector of the axis E of the two sonobuoys 13 and 14, they will receive the noise signals simultaneously and the time delay between the arrival of the acoustic signal at sonobuoy 13 and sonobuoy 14 will be zero. Deviation of the sound source or submarine from this perpendicular bisector will yield a corresponding time delay which can be observed as a change in bearing of the submarine. In this manner the submarine bearing $\theta_1$, which is the angle formed by the interception of the line S and the sonobuoy axis E, can be determined. Therefore, it remains only to determine this time delay which is in turn an indication of the bearing.

Figure 5:
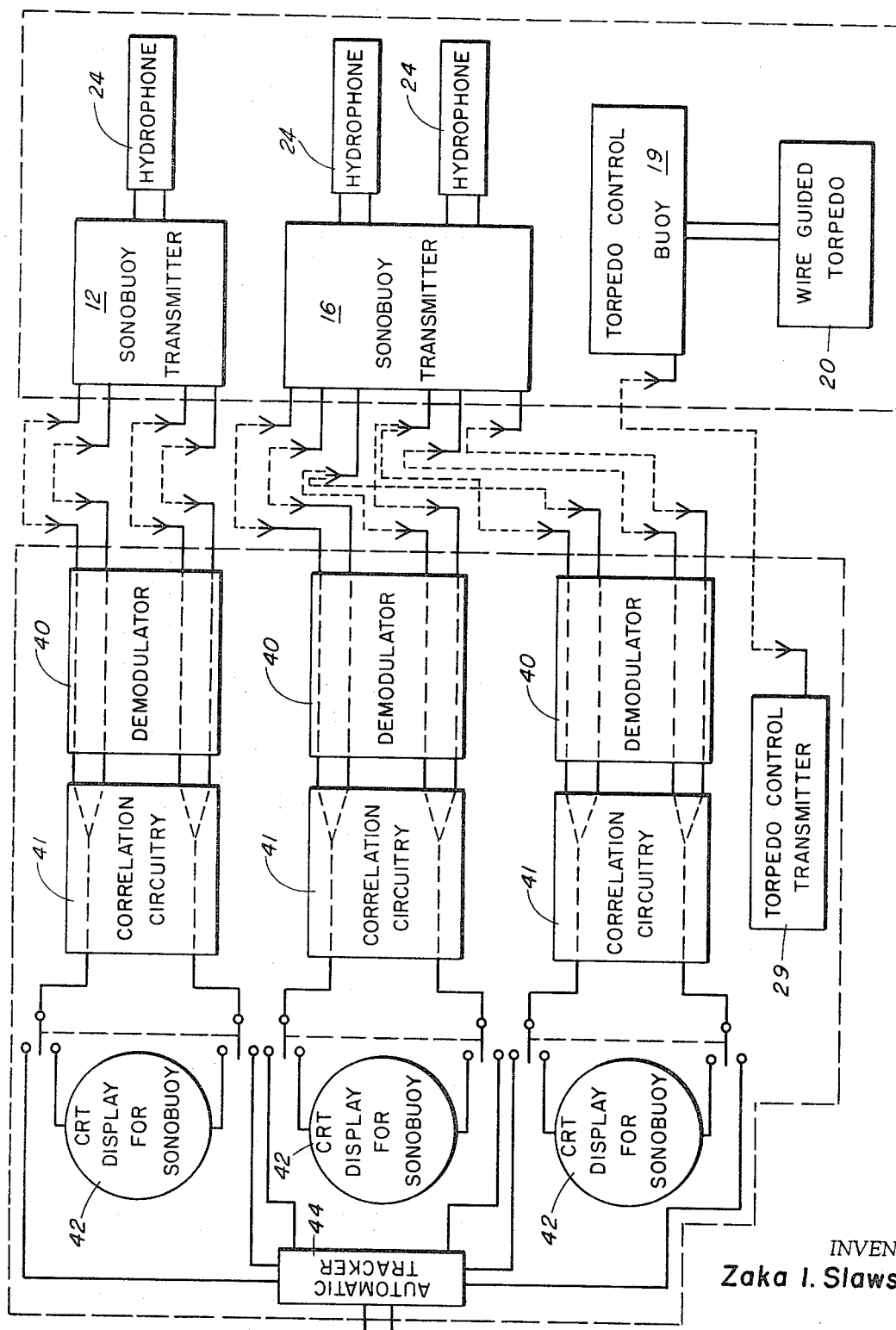
FIG. 5 is a block diagram representing the electrical circuitry used in the correlation sonobuoy system for determining the target intercept course of the torpedo.

By solving the correlation function for the two signals in the receiving channels and displaying the resulting correlogram on a display service such as a calibrated CRT, as shown in FIG. 5, an indication of the desired delay time is provided. Since the acoustic signals transmitted are carried by a modulating signal, it is first necessary to demodulate the signals in a demodulator 40 to recover the desired acoustical signal. Then by the use of Deltic (an abbreviation for Delay Line Time Compressor) loops or other correlation means in the correlation circuitry 41 the two acoustic signals are multiplied together with different delay times introduced between them. Taking the average value of the product of this time delay multiplication of the two acoustic signals is a computing process which results in the solution of the correlation function. U.S. Pat. No. 2,958,039 to Victor C. Anderson provides a detailed analysis of the correlation function solution of two signals by means of Deltic processing.

Since the correlation function is the average value of the product of the signals as a function of delay, the peak or maximum value of the correlation function amplitude indicates the optimum delay which is a difference in arrival times of the submarine noise signal at the two hydrophones 27. This delay time is a measure of the bearing of the submarine with respect to the axis E of the two sonobuoys 13 and 14.

Thus it may be seen that a pair of hydrophones 27 will detect submarine noise signals and by correlation processing of the two detected signals an indication of the bearing $\theta_1$ of the submarine 11 with respect to the axis E of the two sonobuoys 13 and 14 which house the hydrophones 27 can be obtained. A second pair of sonobuoys 16, in like manner, is capable of locating the submarine 11 by providing a bearing $\theta_3$ with respect to the axis F of the sonobuoy pair 16. The intersection of the two lines representing the bearings $\theta_1$ and $\theta_3$ derived from the sonobuoy pairs 12 and 16, respectively, is an indication therefore of the position of the submarine 11. If the location of the four sonobuoys is known, with respect to some coordinate system, conventional plotting techniques will provide the pilot of the aircraft with the position of the submarine and he can utilize this information to direct a successful attack against the submarine.

Major inaccuracies of prior systems of this character arise from the lack of information concerning the exact location of the sonobuoy pairs 12 and 16. These inaccuracies are due to the fact that sonobuoys are dropped from the aircraft while in flight and drifting of the sonobuoys from a desired predetermined location is brought about by air currents during the descent of the sonobuoys and by ocean currents which tend to alter the position of the sonobuoys after their descent. This drifting constitutes a particularly significant source of error and renders the sonobuoy system useless after a very short period of time.

The present invention employs the same correlation sonobuoy system to track a torpedo as well as to track a submarine, thus guiding the path of the torpedo by the same point of reference from which the submarine detection signals are obtained thereby eliminating the necessity of knowing the precise locations of the sonobuoys in the ocean. The bearing angles of the torpedo with respect to the sonobuoy pairs 12 and 16 is determined and displayed in such a way that the coincidence of the torpedo and the target submarine positions is clearly indicated without the need for a geometric coordinate fire control system and therefore is independent of precise information defining the exact sonobuoy positions.

When the sonobuoy pattern is dropped from the aircraft, an additional buoy 19 is also dropped, said buoy having a torpedo 20 connected thereto by means of an electrical control cable 21. The buoy 19 has an RF receiver mounted thereon to provide a communication link with the aircraft 15, whereby the aircraft may transmit signals to the RF receiver and control system on the buoy 19 to launch and guide the path of the torpedo, the electrical conductor 21 being mounted on reels in the buoy and the torpedo to provide a continuous communication channel between the torpedo and the buoy as the torpedo moves toward the target.

Figure 4A:
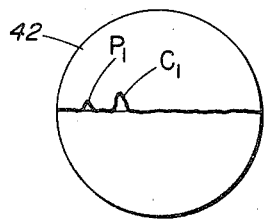
FIGS. 4A, 4B and 4C illustrates the display of the correlated signals which provide an indication of the relative bearings of the submarine and the torpedo and further provides indication of the depth of the submarine.
Figure 4B:
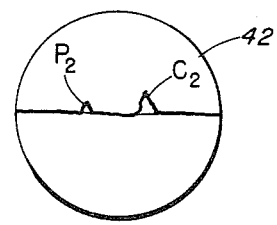
Figure 4C:
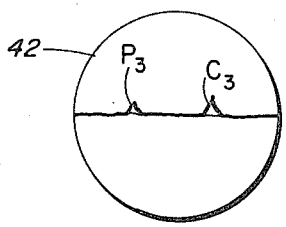

Considering again the single pair of sonobuoys 12 in FIG. 1 and the circuitry of FIG. 5, it may be seen that the aircraft receives radio signals from the two sonobuoys 13 and 14. These signals are demodulated in separate channels to obtain the acoustic signals received by the sonobuoy hydrophones 27. Deltic loops, or other similar equipment, provide the necessary correlogram of the outputs of the two sonobuoy hydrophones 27 thereby providing an indication of the signal delay times necessary to determine the bearing. The position of the peak or maximum value of the correlogram (FIG. 4) can be displayed on any suitable device such as a calibrated oscilloscope 42 for visual tracking or can be used as an input to an automatic tracker 44. Therefore the display device will provide an indication of the direction from which the acoustic signal arrives at the pair of hydrophones 27. If (d) is the spacing between the sonobuoys, and $C_s$ is the velocity of sound in the water, then the delay at which the peak of the correlogram occurs is given by:

$$\Delta_1 = (2d/C_s) \cos \theta_1$$

Where $\theta_1$ is the angle shown in FIG. 1 formed by the axis E of the hydrophone pair and the line S drawn from the submarine 11 to a point on the axis E equidistant from the sonobuoys 13 and 14. In a similar manner, when the acoustic noise produced by the running torpedo 20 is received at the two sonobuoys 13 and 14, the time delay of this acoustic signal can be transmitted back to the aircraft for determining the bearing $\theta_2$ of the torpedo. This delay time can be represented by the expression:

$$\Delta_2 = (2d/C_s) \cos \theta_2$$

Where $C_s$ is the velocity of sound in the water and $\theta_2$ is the angle formed by the intersection of the sonobuoy axis E and a line drawn from the torpedo to a point on the axis E equidistant from the sonobuoys 13 and 14. Therefore, if the angles $\theta_1$ and $\theta_2$ are equal, the torpedo is at the same bearing with respect to the sonobuoy pair as is the submarine. Precise measurements of the time delays are, of course, irrelevant since the equality of angles $\theta_1$ and $\theta_2$ is indicated on an oscilloscope by the coincidence of the correlograms.

Figure 2:
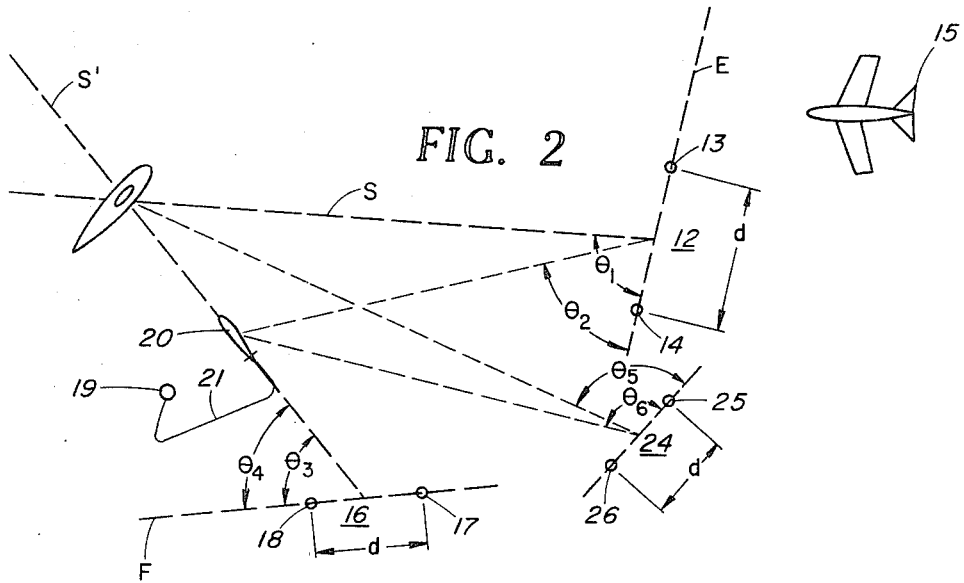
FIG. 2 illustrates a plan view of the geometry of the submarine tracking problem wherein the aircraft is controlling the path of a wire guided torpedo toward the target submarine by means of radio communication with a buoy to which the wire guided torpedo is connected.
Figure 3:
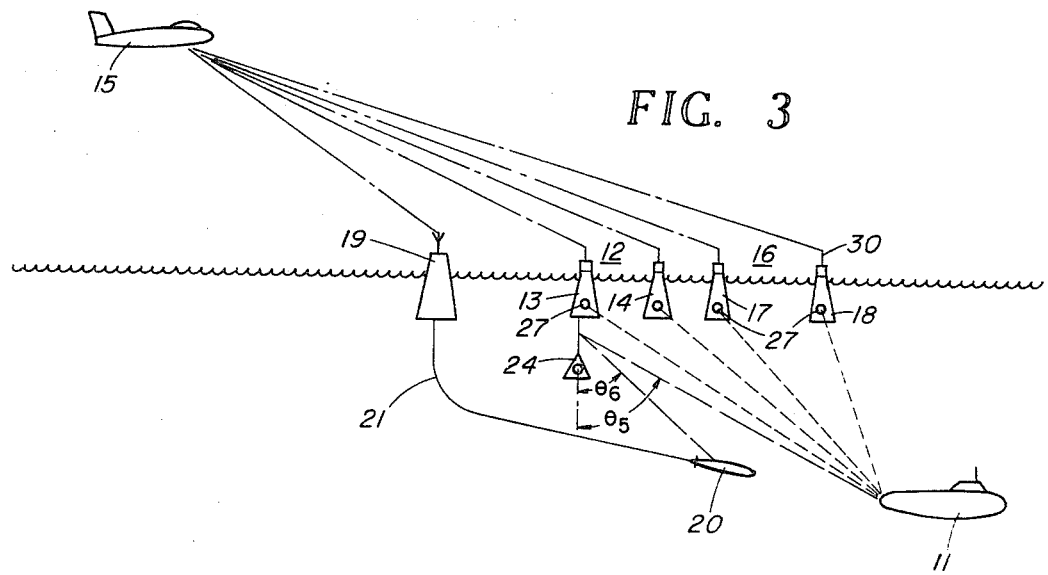
FIG. 3 illustrates an elevational view of the submarine tracking system in operation.

Assuming that there are two sonobuoy pairs 12 and 16 from which the aircraft is receiving time delay information signals resulting from the acoustic signals generated by the submarine and by the torpedo, this information undergoes the aforedescribed Deltic processing and is supplied to oscilloscopes 42 or similar display devices corresponding to each sonobuoy pair 12 and 16. The correlogram $C_1$ (FIG. 4a) of the acoustical signal from the submarine and the correlogram $P_1$ of the acoustical signal from the torpedo, whose displacement from a given origin is proportional to $\Delta_2$ are displayed on the oscilloscope. Therefore, if the correlogram $P_1$ is superimposed directly over the peak or maximum value of the correlogram $C_1$ on one of the display devices, the bearing angles $\theta_1$ and $\theta_2$ will be equal and therefore the torpedo 20 and submarine 11 have the same bearing with respect to the sonobuoy pair 12 which is providing the input information to the oscilloscope. By observing the correlograms for the torpedo and the submarine displayed on the oscilloscope 42, the aircraft pilot may control the wire guided torpedo 20 by means of radio communication with the torpedo buoy 19 to steer the torpedo onto the same bearing as the bearing of the target submarine, at which time correlograms $P_1$ and $C_1$ will be superimposed. While controlling the course of the torpedo 20 to maintain the same bearing with respect to sonobuoy pair 12 as the submarine, any deviations of the torpedo will be detected by the pilot by observing a separation of the correlograms for the torpedo and the submarine and the pilot may transmit a command signal to the torpedo to direct the torpedo back onto the submarine's bearing. By observing the movement of the correlogram $P_2$ with respect to the peak of the correlograms $C_2$ on the display device 42 which is responsive to information signals from sonobuoy pair 16, the pilot can determine whether or not the torpedo is converging on or diverging from the submarine pair 11. By observing the overlay of the correlograms produced by the signals coming from the second pair of sonobuoys 16 and displayed on the second display device 42 and concurrently keeping the correlogram $P_1$ on the peak of correlogram $C_1$ on the first display device, the pilot is able to direct the torpedo along the line S in FIG. 2 until coincidence of the torpedo and the submarine is indicated by the correlogram peaks matching on both of the display devices at which time the torpedo should make impact with the target submarine.

To insure that the torpedo hits the submarine when the correlograms of the torpedo and submarine are superimposed on both display devices, it is necessary to provide a means for controlling the depth of the torpedo to coincide with the depth of the submarine. To provide the correlation sonobuoy system with depth information, a pair of vertically spaced hydrophones 24, comprising hydrophones 25 and 26, is dropped when the sonobuoy pattern is dropped. By measuring the time delay of the acoustic signal from the submarine and torpedo as received by the sonobuoy hydrophones 25 and 26 and transmitting this information to the aircraft in the same manner employed with sonobuoy pairs 12 and 16, the signals may be processed through a demodulator and correlation circuitry for display upon a third oscilloscope 42. The depth of the submarine and torpedo, as shown by angles $\theta_5$ and $\theta_6$ respectively in FIGS. 1 and 2, may be indicated by the correlogram $C_3$ in FIG. 4c while the depth of the torpedo may be illustrated by correlogram $P_3$ in FIG. 4c whereby the pilot may transmit control signals to the torpedo to maintain coincidence of correlograms $P_3$ and $C_3$ to insure that the torpedo runs at the same depth as the submarine. It is apparent therefore that when the correlograms of the torpedo and the submarine are in coincidence on all three display devices, a different hit of the torpedo upon the target submarine is assured.

It is foreseeable that the target submarine may go silent during the running period of the torpedo, in which event the hydrophones would not be able to pick up a signal from the target submarine for display on the oscilloscopes but would only detect acoustic signals from the torpedo. Under such circumstances, the fire control director may mark the last known position of the submarine on the oscilloscope or otherwise note its location. The oscilloscope will continue to display the correlogram for the torpedo and the target may then be illuminated by means of dropping an explosive charge from the aircraft. The echo bouncing off of the submarine will be detected by the hydrophones and displayed on the oscilloscope at the same position as the marked last known location of the submarine if the submarine has remained on that bearing. If, however, the submarine has moved, the position of the submarine correlogram produced by the echo will be displaced from the last known correlogram position on the oscilloscope and may be readily observed and this information may be used to further command the torpedo to put it back on a bearing with the submarine. It is further advantageous to use a torpedo in this system which continuously dispenses a visually and infrared radar detectable material into its wake which may be visually observed from the aircraft and which will also reflect infra-red radar to enable the aircraft to follow the torpedo along its path to the target submarine. Since these aircraft are generally equipped with magnetic airborne detection equipment, the aircraft may follow the torpedo wake either visually or by radar to the vicinity of the submarine and the magnetic detection gear is then capable of accurately pinpointing the location of the submarine which may be marked by a marker buoy as a guide for further air launched attacks. As an alternative measure for use against silent targets, the system may be provided with a wire guided torpedo having an active homing system whereby when the submarine goes silent during the running period of the torpedo, the aircraft may transmit a command signal to the torpedo to activate the terminal homing system.

Although the preceding discription of the correlation sonobuoy system having an air launched, wire guided torpedo has been directed to an airplane as the tracking vehicle, it is also possible to use a hovering aircraft as the tracking vehicle. When a helicopter is used as the tracking vehicle, the control wire 21 for the wire guided torpedo 20 may be connected directly to the helicopter rather than to a floating buoy 19. By eliminating buoy 19, the helicopter has a direct electronic communication link with the torpedo as opposed to a radio communication link therebetween.

The correlation sonobuoy system of the present invention may also be used in situations where a surface vessel is the tracking vehicle in which case the sonobuoy pairs 12 and 16 and the depth information hydrophones 24 as well as the wire guided torpedo buoy are dropped over the side of the ship in a pattern similar to that provided by the air dropped system. In this situation the signals from the sonobuoys are transmitted to the surface vessel which then commands the wire guided torpedo by means of a radio communication link to the torpedo buoy 19. In the event that the target submarine goes silent during the running period of the torpedo, the surface vessel may throw any one of the presently used explosive charges for producing acoustic echoes from target submarines to provide the necessary target illumination in the same manner heretofore described. If the surface vessel is already equipped with a listening hydrophone array, it is only necessary that the ship drop the wire guided torpedo 20 and its buoy 19 over the side and also provide a depth information determining means. The depth information may be obtained by dropping the hydrophone pair 24 over the side or may be alternatively determined by towing a single hydrophone at a depth lower than the submergence of the hydrophone array mounted on the ship. Alternatively, the surface ship may pursue the target submarine thereby tracking the acoustic signals from the submarine and from the surface vessel itself by the null method until the surface vessel is above the submarine.

The system of this invention may also be used on a submarine by employing the submarine's hydrophone array such as the PUFFS system on submarines and PADLOCK system on surface ship to passively track the target and the torpedo simultaneously while towing an additional hydrophone at a deeper depth to obtain target depth information. If the target being tracked by the submarine goes silent while the torpedo is running, the target may be illuminated by using the submarine's sonar for determining the target position or, if the torpedo has a moving system included therein, the submarine may transmit a signal to the torpedo to activate the homing system for generating acoustic signals by the torpedo for detection at the hydrophones. It is also within the scope of the present invention to illuminate the silent target by having the submarine drop a charge or a series of charges in the same manner as the target illumination accomplished by the surface vessel or aircraft. The target may also be illuminated by providing a torpedo having a mechanism therein for discharging an explosive sounding charge or a series of sounding charges as it runs toward the target.

From the foregoing it may be seen that the present invention provides a new and improved method and system for submarine tracking which utilizes a correlation technique to process signals received by sonobuoy pairs in determining the relative positions of the target and a torpedo. The lack of precise data defining the exact location of the sonobuoy pairs does not render this system inaccurate. The intricate computer systems required in conventional coordinate fire control systems are not required in this correlation system which is essentially a null system. The correlograms of the target and the torpedo are kept superimposed and only the deviations from coincidence of the correlograms need be detected, thereby providing a system employing equipment which is much simpler than conventional systems and having a substantially greater degree of effectiveness and reliability. The system of this invention also enables the use of fast running torpedos since the noise generated by the fast torpedo is advantageous to the system rather than detrimental thereto as is the case with conventional acoustic homing torpedoes. By employing the present system, the problem of countermeasures for decoying the torpedo is substantially much more difficult.

Whereas the invention has been described with reference to the anti-submarine warfare system, it will be understood that various other arrangements may be employed, for example a correlation system of this type on a submarine enables the submarine to attack surface vessels as well as submarine targets with little or no risk of detection.

Obviously many modifications and variations of the present invention are possible in the light of the above teachings. It is therefore to be understood, that within the scope of the teachings herein and the appended claims, the invention may be practiced otherwise than as specifically described.

What is claimed and desired to be secured by Letters patent of the United States is:

1. The method of intercepting a submarine with a torpedo comprising the steps of
    planting a first and second pair of sonobuoys by a tracking vehicle within the vicinity of said submarine thereby to transmit channeled radio signals from each of said sonobuoys corresponding to acoustic signals emanating from said submarine and from said torpedo and being received at each sonobuoy,
    launching a wire guided torpedo,
    receiving channeled signals transmitted from each sonobuoy corresponding to said acoustic signals received from said submarine and said torpedo,
    generating a first and a second correlation signal from said channeled signals corresponding to the pairs of acoustic signals emanating from said submarine and received at said first and second pair of sonobuoys respectively,
    generating a third and fourth correlation signal from said channeled signals corresponding to the pairs of acoustic signals emanating from said torpedo and received at said first and second pair of sonobuoys respectively,
    visibly displaying said first and third correlation signals on a first display device and said second and fourth correlation signals on a second display device,
    steering said torpedo to a bearing where the peaks of the correlation signals appearing on said first display device are superimposed,
    maintaining the torpedo on said bearing which yields the superimposed correlation signals on said first display device and concurrently therewith,
    positioning the torpedo until the peaks of said second and fourth correlation signals are superimposed on said second display device thereby to give an indication that said torpedo has intercepted the submarine.

2. The method of claim 1 further comprising the steps of
    continuously dispensing a material into the wake of the torpedo which material may be visually detected by aircraft and also may be detected by infrared radar, whereby an aircraft may follow the torpedo wake to the submarine for subsequent detection and location of the submarine by magnetic detection gear on the aircraft.

3. The method of claim 1 further comprising the steps of:

planting one other sonobuoy within the vicinity of the submarine having a pair of vertically spaced hydrophones thereby to transmit channeled radio signals corresponding to the acoustic signals emanating from said submarine and from said torpedo, receiving channeled signals transmitted from said other sonobuoy indicative of the depths of said submarine and said torpedo, generating fifth and sixth correlation signals from said channeled signals corresponding to the acoustic signals received at said pair of vertically spaced hydrophones, visibly displaying said fifth and sixth correlation signals on a third display device, and controlling the depth of the torpedo so that the peaks of the correlation signals appearing on each of the three display devices are superimposed.

4. The method of claim 3 wherein the depth and bearing of the torpedo is controlled by transmitting radio frequency torpedo command signals from a transmitter in the tracking vehicle, and receiving said radio frequency torpedo command signals with a radio frequency receiver on a floating buoy having an electrical communication link with said wire guided torpedo.

5. The method of tracking a target submarine and directing a torpedo to intercept said submarine comprising the steps of:

planting a first and second pair of sonobuoys from a tracking vehicle within the vicinity of said submarine to transmit channeled radio signals from each of said sonobuoys corresponding to acoustic signals emanating from said submarine and said torpedo and being indicative of the bearings of the submarine and torpedo, planting one other sonobuoy having a pair of vertically spaced hydrophones from said tracking vehicle within the vicinity of said submarine to transmit radio signals from said other sonobuoy corresponding to acoustic signals emanating from said submarine and said torpedo and being indicative of the depths of said submarine and said torpedo, planting a torpedo control buoy having a wire guided torpedo connected thereto, receiving channeled signals transmitted from each sonobuoy corresponding to said acoustic signals emanating from said submarine and from said torpedo, generating a first and second correlation signal from said channeled signals corresponding to the pairs of acoustic signals emanating from said submarine and received at said first and second pair of sonobuoys respectively, generating a third and fourth correlation signal from said channeled signals corresponding to the pairs of acoustic signals emanating from said torpedo and received at said first and second pair of sonobuoys respectively, generating a fifth and sixth correlation signal from said channeled signals corresponding to the acoustic signals emanating from said torpedo and from said submarine and received at said other sonobuoy, visibly displaying said first and third correlation signals on a first display device and said second and fourth correlation signals on a second display device and said fifth and sixth correlation signals on a third display device, transmitting command signals to said torpedo control buoy to steer the torpedo to a bearing and depth where the peaks of the correlation signals appearing on said first and third display devices are superimposed respectively, and controlling said bearing and depth of the torpedo which yields the superimposed correlation signals on said first and third display devices until the correlation signals displayed by all three display devices are superimposed thereby to give an indication that said torpedo has intercepted said target submarine.

6. The method of claim 5 further comprising the steps of detonating an underwater explosive charge in the vicinity of the target submarine for illuminating the submarine's position in the event that the submarine goes silent, visibly detecting the correlation signals obtained by detecting the acoustic sound wave produced by said charge and reflected off of the target submarine, whereby the position of the illuminated submarine correlation signal on the display device may be compared with the last observed correlation signal of the submarine to detect any changes in position of the target submarine.

7. The method of tracking a submerged submarine and directing a torpedo to intercept said submarine from a surface vessel tracking vehicle comprising the steps of:

launching a wire guided torpedo in a direction toward the target submarine, receiving acoustic signals generated by said submarine and by said torpedo at a pair of horizontally spaced apart hydrophones mounted upon the surface vessel and by a pair of vertically spaced apart hydrophones connected to the surface vessel, generating a first and second correlation signal corresponding to the acoustic signals received at said horizontally spaced hydrophones, generating third and fourth correlation signals corresponding to the acoustic signals received at said vertically spaced hydrophones, visibly displaying said first and second correlation signals on a first display device and said third and fourth correlation signals on a second display device, directing the torpedo to a bearing and depth where the peaks of the correlation signals appearing on said first display device are superimposed and the peaks of the correlation signals on said second display device are superimposed thereby to give an indication that said torpedo is on an intercept course with said target submarine.

8. The method of claim 7 further comprising the steps of detonating at least one underwater explosive charge in the vicinity of the submarine for illuminating the target position in the event that the target goes silent, and displaying the correlation signals derived from a reflected acoustic wave produced by the explosive charge upon the display devices for comparison with the last observed position of the submarine.

9. The method of tracking a target submarine and directing a torpedo to intercept said submarine from an attack submarine comprising the steps of launching a wire guided torpedo in the direction of the target submarine, detecting acoustic signals emanating from said torpedo and from said target submarine at a pair of horizontally spaced hydrophones mounted upon the attack submarine, detecting acoustic signals emanating from said torpedo and said target submarine by a pair of vertically spaced hydrophones suspended from said attack submarine, generating a first and second correlation signal corresponding to the acoustic signals received by said pair of horizontally spaced hydrophones and being indicative of the target and torpedo bearings, generating a third and fourth correlation signals corresponding to the acoustic signals detected by said vertically spaced hydrophones and being indicative of the depths of said torpedo and target submarine, displaying said first and second correlation signals on a first display device, visually displaying said third and fourth correlation signals on a second display device, and directing the torpedo to a bearing and depth where the first and second correlation signals are superimposed on said first display device and said third and fourth correlation signals are superimposed on said second display device.

10. The method of claim 9 further comprising the steps of:

transmitting a signal from said attack submarine to said torpedo to activate a homing system incorporated in the torpedo to produce acoustic echo signals for detection, processing and displaying said signals on said first and second display devices in the event that the target submarine goes silent during the running period of the torpedo.

11. The method of claim 9 further comprising the steps of:

transmitting a signal from the attack submarine to the torpedo to dispense at least one explosive charge from said torpedo to illuminate the target submarine in the event said target submarine goes silent, and displaying the correlation signal derived from the reflected acoustic wave generated by the explosive charge upon the display devices to ascertain the target submarine's position.

12. In a system for tracking a submarine by an aircraft and directing a torpedo to intercept said submarine, in combination;

a radio receiver carried by an aircraft for receiving channeled signals, a transmitting station having means for receiving acoustic signals emanating from said submarine and from said torpedo, and having means for transmitting channeled signals to said radio receiver corresponding to said received acoustic signals.

13. In a system for tracking a submarine by an aircraft and directing a torpedo to the submarine, in combination;

a torpedo control buoy having a wire guided torpedo connected thereto and having a first radio receiver mounted thereon, second radio receiver carried by said aircraft for receiving channeled signals, a plurality of sonobuoys each having an antenna and a transmitter for sending channeled signals to said aircraft and acoustic signal receiving means positioned for detecting acoustic signals emanating from said submarine and said torpedo for determining any differences in the bearings and depth of the submarine and the torpedo, signal display means connected to said second receiver for processing said channeled signals thereby indicating any difference in the relative positions of said torpedo and said submarine, and a radio frequency transmitter carried by said aircraft for transmitting command signals to the torpedo control buoy for directing the torpedo on an intercept course with said submarine.

* * * * *